May 8, 1962     N. D. VALLE     3,032,914
LEADER RACK
Filed March 13, 1961
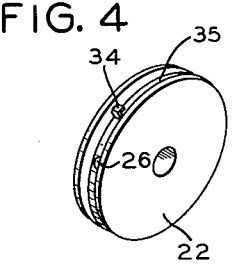
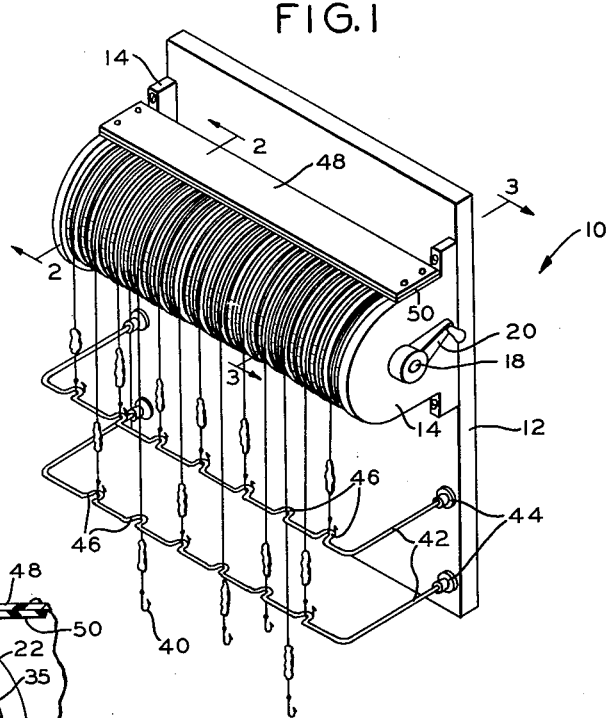
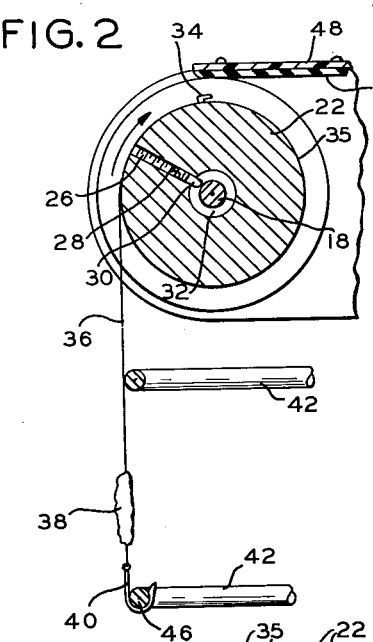
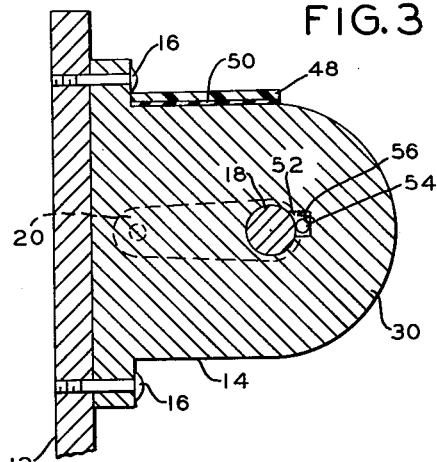
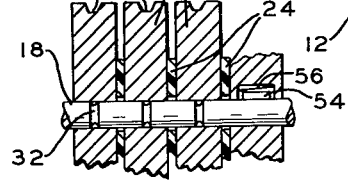
*INVENTOR.*
NEARO DELLA VALLE United States Patent Office 3,032,914
Patented May 8, 1962

3,032,914
LEADER RACK
Nearo Della Valle, R.D. 2, Box 82, Medford, N.J.
Filed Mar. 13, 1961, Ser. No. 95,369
6 Claims. (Cl. 43—57.5)

This invention relates to fishing equipment and, more particularly, to a multiple leader storage rack.

It is an object of the present invention to provide a leader rack which will conveniently support a plurality of individual leaders in a convenient location, ready for removal whenever required, and which will also provide for the convenient mounting of such leaders thereupon.

A further object of the present invention is to provide a leader rack of the type described which will readily accommodate both wire and plastic leaders, without kinking or damage thereto, and which can be readily mounted at any desired location.

An additional object of the present invention is to provide a leader rack having a plurality of individual leader spools rotatably mounted upon a main shaft, which shaft is secured against rotation in one direction and mounted with a handle for rotation in an opposite direction, with each individual spool having friction means acting between such spool and shaft frictionally resisting relative rotation between each spool and shaft, so that each such spool may be readily rotated upon the shaft in an effective manner for purposes hereinafter more fully described.

A further object of the present invention is to provide a rack of the aforementionel type which can be readily adapted for mounting upon the side of a boat, within a tackle box, or the like, so as to be conveniently accessible for use whenever required.

All of the foregoing and still further objects and advantages of this invention will become apparent from a study of the following specification, taken with the accompanying drawing, wherein:

FIGURE 1 is a perspective view of a leader rack made in accordance with the present invention in actual use;

FIGURE 2 is an enlarged fragmentary cross sectional view of certain parts of the device shown in FIGURE 1, taken along line 2—2 of FIGURE 1;

FIGURE 3 is an enlarged fragmentary cross sectional view, with parts broken away, taken along line 3—3 of FIGURE 1;

FIGURE 4 is a perspective view of a spool forming a part of the present invention; and FIGURE 5 is a fragmentary cross sectional view of a few of the spools of the present invention mounted upon the shaft, illustrating the use of spacer elements therebetween.

Referring now to the drawing, a leader rack 10 made in accordance with the present invention is shown to include a pair of bearing elements 14 which may be conveniently mounted upon a mounting board or panel 12 for rotatably supporting a main shaft 18 therebetween. These bearing plates 14 may be secured, such as by bolts 16, to the panel 12 or may be secured directly to the side of a tackle box, boat, or the like, depending upon the particular application to which the rack is to be placed.

A handle 20 is secured to one end of the shaft 18, whereas a plurality of substantially identical spools 22 are secured upon the main portion of the shaft 18 between the bearing plates 14, and maintained in slightly spaced apart relationship by means of shims or washers 24 which further prevent binding of the spools 22 relative to each other, to accomodate relative rotational movement therebetween.

Each spool 22 is provided with a radially extending, internally threaded bore 26 within of which a set screw 28 is threadedly received for exerting a radially inwardly directed pressure upon a pressure pad 30 slidably received within an annular groove 32 of the shaft 18. Thus, each groove 32 automatically positions each respective spool 22 along the length thereof, and the friction pads 30 may be tightened sufficiently to frictionally resist rotational movement between the shaft and spool. Thus, rotation of the shaft 18 will also carry the spool 22 therewith, unless such rotation is resisted by a leader 36 secured at one end upon an anchor pin 34 within the groove 35 of the spool. The opposite end of the leader 36 may be provided with a lure 38 and hook 40 anchored upon individual indents 46 formed in a pair of vertically spaced apart anchor bars 42 which may be secured to the base or panel 12, such as by fittings 44.

At least one of the bearing plates 14 is provided with a cut out 52 communicating with the shaft receiving aperture thereof, within of which cut out 52 is positioned a roller 54 that may be biased by gravity or by a spring 56 toward frictional engagement with the surface of the shaft 18. As the indent 52 is tapered downwardly, downward movement of the roller 54 causes frictional engagement with the shaft 18, sufficient to lock the shaft against rotation in a direction which would unwind the leaders mounted upon the spools in the manner shown in FIGURES 1 and 2. However, the roller 54 readily allows the shaft 18 to rotate in the opposite direction under the action of the handle 20, to wind the leaders upon the spools 22.

It will thus be recognized that a leader may be removed from one of the spools 22 simply by exerting an outward pull upon the leader 36, which pull is sufficient to overcome the frictional resistance between the respective spool 22 and the shaft 18 created by the engagement of the pad 30 within the groove 32. During such unwinding of one of the leaders, the remaining leaders remain in the taut position shown because of the locking action of the roller 54 upon the shaft. In a similar manner, a single leader may be wound upon a spool 22 by engaging the one end thereof with the anchor pin 34 and rotating the shaft 18 in the permitted direction. Even though other leaders are mounted upon the rack, the friction pads 30 will allow the shaft 18 to rotate with respect to those spools 22 already having leaders 36 secured thereupon, thus preventing interference with the winding of the individual leader thereupon.

Additional friction means may be provided in the form of a yieldable pad 50 secured to an overlying guard plate 48 mounted between the bearing plates 14 and partially overlying the spools 22. This flexible pad 50, such as rubber or neoprene may be frictionally engaged with the peripheries of the spools 22, thus tending to resist relative rotation therebetween, but allowing such relative rotation for purposes of winding or unwinding in the manner hereinbefore described. The guard plate 48 further serves to prevent the winding of one of the leaders 36 on more than one spool, by maintaining such windings upon the spool initially engaged by the leader. This plate 48 also serves to prevent small objects from falling between the spools and the bearing plates 14 or base 12, as well as to serve as some protection therefor against the elements and the like.

It will now be recognized that this device may be readily mounted upon the side of the boat, or especially adapted for enclosing within a tackle box. Also, the unit can be constructed in any desired size and from any desired materials, for the purposes described.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. A leader rack comprising, in combination, a shaft, bearing means rotatably supporting said shaft, clutch means locking said shaft against rotation upon said bearing means in one direction, handle means for rotating said shaft in an opposite direction, a plurality of spools individually rotatably supported upon said shaft, friction means acting between each said spool and said shaft frictionally resisting relative rotation between each said spool and said shaft, and each said spool having means windingly supporting a leader thereupon.

2. A leader rack as set forth in claim 1, further comprising anchor means releasably engaging one end of each leader for limiting rotation of each said spool relative to said shaft with a leader windingly mounted thereupon.

3. A leader rack as set forth in claim 2, wherein said clutch means comprises a friction roller carried by said bearing means engageable with said shaft, said bearing means defining a tapered indent slidably receiving said friction roller therewithin for movement into increased frictional engagement with said shaft in response to rotation of said shaft in said one direction to lock said shaft against rotation in said one direction relative to said bearing means.

4. A leader rack as set forth in claim 3, further comprising a compression coil spring acting between said bearing means and said roller yieldably urging said roller toward said frictional engagement and yielding in response to movement of said roller in a direction away from increased frictional engagement with said shaft to allow rotation of said shaft in said opposite direction.

5. A leader rack as set forth in claim 4, wherein said friction means comprises a friction pad carried by each said spool, each said spool having a radially extending bore slidably receiving said friction pad therewithin, screw means locking said pad within said bore in frictional engagement with said shaft, and said shaft including a plurality of longitudinally spaced apart annular grooves each slidably receiving a portion of one of said friction pads therewithin.

6. A leader rack as set forth in claim 5, wherein said friction means further comprises a yieldable pad overlying said spools and having peripheral engagement with said spools yieldably resisting relative rotation therebetween.

No references cited.